United States Patent
Rausch et al.

(10) Patent No.: US 8,339,905 B2
(45) Date of Patent: Dec. 25, 2012

(54) ALIGNMENT FEATURES FOR HEAT ASSISTED MAGNETIC RECORDING TRANSDUCERS

(75) Inventors: Tim Rausch, Gibsonia, PA (US); William Albert Challener, Sewickley, PA (US); Edward Charles Gage, Mars, PA (US); Christophe Daniel Mihalcea, Pittsburgh, PA (US); Chubing Peng, Pittsburgh, PA (US); Patrick Breckow Chu, Wexford, PA (US); Kevin Arthur Gomez, Wexford, PA (US)

(73) Assignee: Seagate Technology LLC, Cupertino, CA (US)

( * ) Notice: Subject to any disclaimer, the term of this patent is extended or adjusted under 35 U.S.C. 154(b) by 1869 days.

(21) Appl. No.: 11/105,139

(22) Filed: Apr. 13, 2005

(65) Prior Publication Data

US 2006/0233061 A1    Oct. 19, 2006

(51) Int. Cl.
*G11B 11/00*    (2006.01)
(52) U.S. Cl. .................................... 369/13.33
(58) Field of Classification Search ............... 369/13.32, 369/13.33, 13.13, 100; 385/129; 250/201.3, 250/201.5; 360/59
See application file for complete search history.

(56) References Cited

U.S. PATENT DOCUMENTS

| | | | |
|---|---|---|---|
| 5,173,747 A * | 12/1992 | Boiarski et al. | 356/481 |
| 5,199,090 A | 3/1993 | Bell | |
| 5,707,727 A | 1/1998 | Takahashi et al. | |
| 5,768,010 A * | 6/1998 | Iwamoto | 359/311 |
| 5,808,973 A | 9/1998 | Tanaka | |
| 6,278,679 B1 | 8/2001 | Weiss et al. | |
| 6,324,149 B1 | 11/2001 | Mifune et al. | |
| 6,404,706 B1 | 6/2002 | Stovall et al. | |
| 6,545,969 B1 | 4/2003 | Berg et al. | |
| 6,545,970 B2 | 4/2003 | Durnin et al. | |
| 6,549,506 B1 | 4/2003 | Johnson et al. | |
| 6,574,257 B1 | 6/2003 | Thronton et al. | |
| 6,603,619 B1 * | 8/2003 | Kojima et al. | 360/59 |
| 6,724,718 B1 | 4/2004 | Shinohara et al. | |
| 2001/0030938 A1 | 10/2001 | Oumi et al. | |
| 2001/0033546 A1 | 10/2001 | Katayama | |
| 2001/0050828 A1 | 12/2001 | Davis et al. | |
| 2001/0055264 A1 | 12/2001 | Cheong et al. | |
| 2002/0001283 A1 | 1/2002 | Niwa et al. | |
| 2002/0006102 A1 | 1/2002 | Durnin et al. | |
| 2002/0011298 A1 | 1/2002 | Jain et al. | |
| 2002/0054560 A1 | 5/2002 | Boutaghou et al. | |

(Continued)

FOREIGN PATENT DOCUMENTS

WO    WO 01/88906 A2    11/2001

(Continued)

OTHER PUBLICATIONS

U.S. Appl. No. 10/854,564, filed May 26, 2004, Gomez et al.

(Continued)

*Primary Examiner* — Joseph Haley
*Assistant Examiner* — Parul Gupta
(74) *Attorney, Agent, or Firm* — Hollingsworth Davis, LLC

(57) ABSTRACT

An apparatus comprises an optical transducer positioned adjacent to a storage medium and including a waveguide and a grating for coupling light into the waveguide, a light source transmitting light to the grating, and a detector for detecting a portion of the light, wherein the detected portion of the light has a magnitude that varies in response to the amount of light coupled into the waveguide.

18 Claims, 10 Drawing Sheets

U.S. PATENT DOCUMENTS

| | | |
|---|---|---|
| 2002/0075784 A1 | 6/2002 | Kim |
| 2002/0080709 A1 | 6/2002 | Park et al. |
| 2002/0122376 A1 | 9/2002 | Song |
| 2002/0150035 A1 | 10/2002 | Bernacki et al. |
| 2002/0176349 A1 | 11/2002 | Gibson et al. |
| 2003/0026038 A1 | 2/2003 | Zeng et al. |
| 2003/0048744 A1 | 3/2003 | Ovshinsky et al. |
| 2003/0072245 A1 | 4/2003 | Ueyanagi |
| 2003/0099189 A1 | 5/2003 | Kim et al. |
| 2003/0103440 A1 | 6/2003 | Kim |
| 2003/0123335 A1 | 7/2003 | Rettner et al. |
| 2003/0128633 A1 | 7/2003 | Batra et al. |
| 2003/0128634 A1 | 7/2003 | Challener |
| 2003/0137772 A1 | 7/2003 | Challener |
| 2003/0184903 A1 | 10/2003 | Challener |
| 2003/0227831 A1 | 12/2003 | Herget |
| 2004/0001394 A1 | 1/2004 | Challener et al. |
| 2004/0001420 A1 | 1/2004 | Challener |
| 2004/0001421 A1 | 1/2004 | Tawa et al. |
| 2004/0008591 A1 | 1/2004 | Johns et al. |
| 2004/0062503 A1 | 4/2004 | Challener |
| 2004/0085861 A1 | 5/2004 | Hamann et al. |
| 2004/0120064 A1 | 6/2004 | Dugas et al. |
| 2005/0248876 A1* | 11/2005 | Kwon et al. ............... 360/97.01 |

FOREIGN PATENT DOCUMENTS

| | | |
|---|---|---|
| WO | WO 03/023768 A1 | 3/2003 |

OTHER PUBLICATIONS

U.S. Appl. No. 10/881,609, filed Jun. 30, 2004, Rausch.
U.S. Appl. No. 11/021,876, filed Dec. 22, 2004, Buechel et al.

* cited by examiner

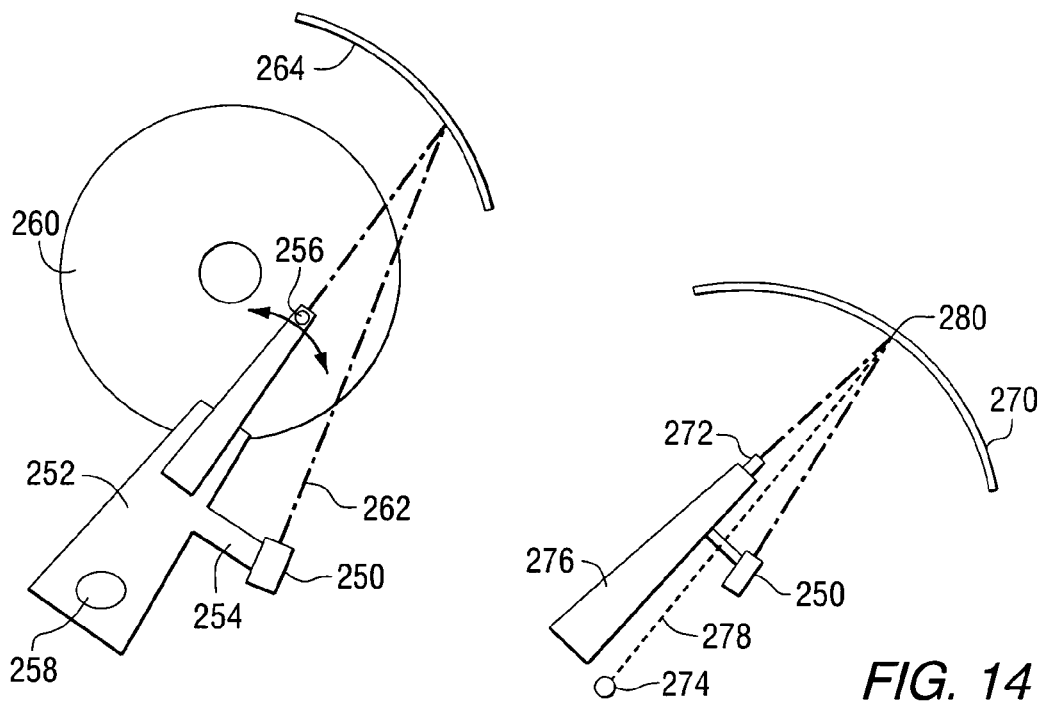
FIG. 13
FIG. 14
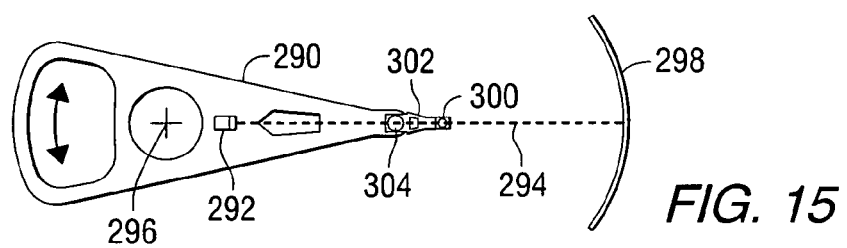
FIG. 15
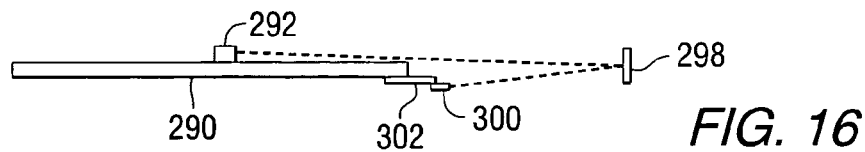
FIG. 16
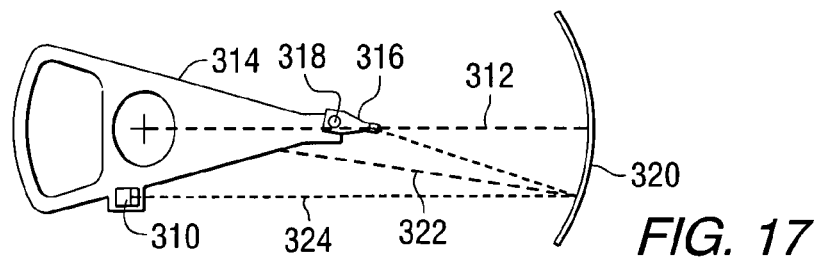
FIG. 17

ALIGNMENT FEATURES FOR HEAT ASSISTED MAGNETIC RECORDING TRANSDUCERS

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to data storage devices, and more particularly to such devices that can be used in optical recording and thermally assisted magnetic recording.

BACKGROUND OF THE INVENTION

In thermally assisted optical/magnetic data storage, information bits are recorded on a layer of a storage medium at elevated temperatures, and the heated area in the storage medium determines the data bit dimension. Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. For heat assisted magnetic recording (HAMR) a tightly confined, high power laser light spot is used to preheat a portion of the recording medium to substantially reduce the coercivity of the heated portion. Then the heated portion is subjected to a magnetic field that sets the direction of magnetization of the heated portion. In this manner the coercivity of the medium at ambient temperature can be much higher than the coercivity during recording, thereby enabling stability of the recorded bits at much higher storage densities and with much smaller bit cells. Heat assisted magnetic recording can be applied to any type of magnetic storage media, including tilted media, longitudinal media, perpendicular media and patterned media.

In HAMR disc drives, it is desirable to efficiently deliver the laser light to the recording head. One approach would be to place a laser source directly on the slider. However, that approach requires additional electrical connections to the slider for the laser. Also, the electrical power dissipated by the laser will substantially heat the slider, which is undesirable for obtaining the best performance from the reader. The added mass of the laser on the slider (or suspension assembly) may also degrade the dynamic and shock performance of the suspension.

Alternatively, a laser source can be located elsewhere in the disc drive and its emitted light carried to the slider through an optical fiber. This approach eliminates the problems with the laser on the slider mentioned above, but introduces a new problem, which is how the optical connection is made between the fiber and the slider. Optical fiber is typically very stiff. If the fiber is physically attached to the slider, the stiffness complicates the design of the gimbal structure that allows the slider to fly over the surface of the disc. Therefore, it is desirable to have a small free space gap between the end of the fiber and the slider. The fiber should be brought to the slider along the suspension and then positioned so that the emitted light illuminates the optical transducer on the slider.

One way that has been proposed to do this is to include a mirror or prism on the suspension to direct the laser beam toward the slider.

One of the requirements for a heat assisted magnetic recording drive is an effective way to couple light from a laser diode or fiber to the coupling grating on the slider. A number of methods have been suggested to date which either require either direct bonding of a fiber to the slider, a significant modification to the slider (such as a deep trench for optics), or the slider flying 180 degrees rotated from its current position. These methods require a major redesign of the air bearings, suspensions and load beams.

A number of different light delivery options for Heat Assisted Magnetic Recording (HAMR) have been proposed. One of the leading ideas is the fiber lens focusing onto a grating on a reversed slider. That method provides a simple optical path and allows for compensation of the vertical motion of the slider during operation due to disk vertical run out. It has the disadvantage of the cost of a fiber pigtailed laser and because of its location it will be difficult to align the fiber lens during manufacturing.

Also, polarization maintaining or polarizing fibers may be required to produce stable and efficient delivery of transverse electric (TE) light to the gratings. These fiber types greatly increase the cost of the pigtailed laser diode and the alignment difficulty due to the rotational requirements.

There is a need for a recording device that can provide localized heating of a recording medium without the need for optical fiber or multiple optical components.

SUMMARY OF THE INVENTION

This invention provides an apparatus comprising an optical transducer positioned adjacent to a storage medium and including a waveguide and a grating for coupling light into the waveguide, a light source for transmitting light to the grating, and a detector for detecting a portion of the light, wherein the detected portion of the light has a magnitude that varies in response to the amount of light coupled into the waveguide.

In another aspect, the invention provides an apparatus comprising a storage medium, an actuator arm for positioning an optical transducer adjacent to a surface of the storage medium, wherein the optical transducer includes a grating for coupling light into a waveguide, a curved mirror positioned radially beyond the storage medium, and a laser module for transmitting light toward the mirror, wherein the light is reflected toward the grating.

The invention further provides an apparatus comprising a storage medium, an actuator arm for positioning an optical transducer adjacent to a surface of the storage medium, wherein the optical transducer includes a grating for coupling light into a waveguide, and a laser module for transmitting light directly toward the grating.

BRIEF DESCRIPTION OF THE DRAWINGS

FIGS. 13 and 14 are schematic representations of disc drives constructed in accordance with this invention.

FIGS. 15-19 are views of suspension arms and slider assemblies that can be used in the invention.

DETAILED DESCRIPTION OF THE INVENTION

Figure 1:
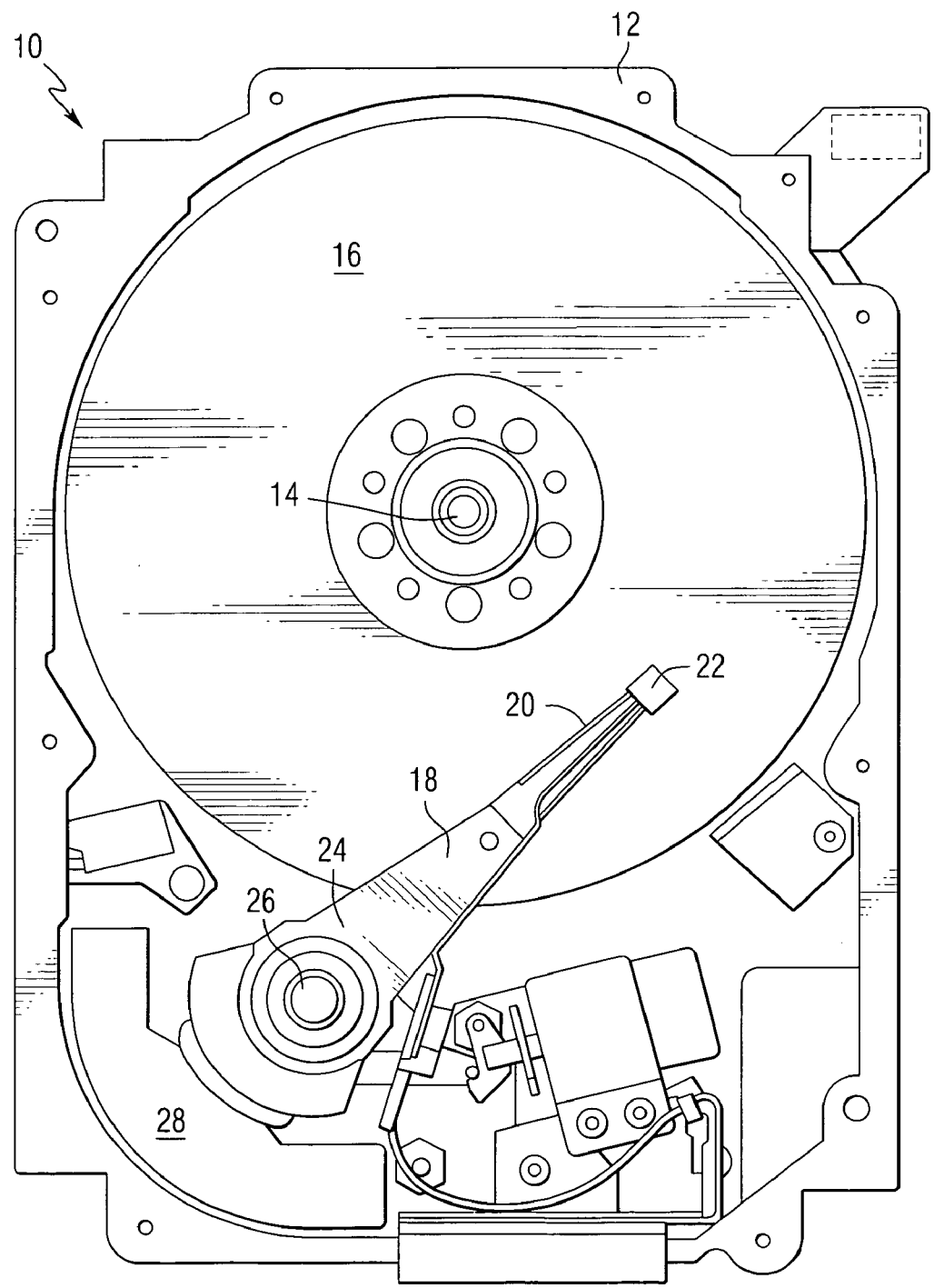
FIG. 1 is a pictorial representation of a disc drive constructed in accordance with this invention.

FIG. 1 is a pictorial representation of the mechanical portion of a disc drive 10 that can be constructed in accordance with the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 on a pivot point on the axis of the shaft, to position the head 22 over a desired sector of the disc 16. The actuator motor 28 is regulated by a controller that is not shown in this view.

Figure 2:
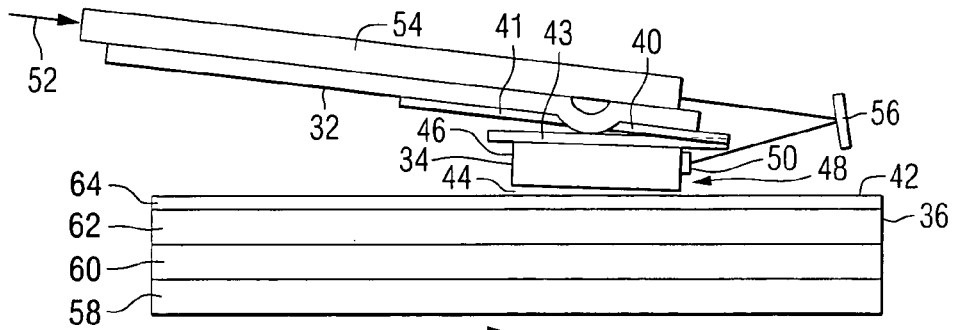
FIG. 2 is a schematic representation of a known arrangement of a slider and a portion of a suspension arm.

FIG. 2 is a schematic representation of a portion of a suspension arm 32 and slider 34 as is known in the art, in combination with a magnetic recording disc 36. During writing and/or reading of data, the disc moves relative to the slider in a direction indicated by arrow 38. The slider is coupled to the suspension arm by a gimbal assembly 40 positioned adjacent to a surface 42 of the disc and separated from the surface of the disc by an air bearing 44. The gimbal assembly includes a first portion 41 connected to the suspension arm 32 and a second portion 43 connected to the slider 34. The second portion is cantilevered to the first portion. The slider has a leading, or front, end 46 and a trailing, or back, end 48. The leading end faces toward the pivot point of the suspension arm and the trailing end faces away from the pivot point of the suspension arm. The slider includes an optical transducer 50 mounted adjacent to the trailing end. A laser produces a beam of light illustrated by arrow 52 that is transmitted toward the slider by an optical fiber 54. A mirror 56 is mounted at the end of the suspension arm to reflect the light toward the optical transducer. The fiber is attached to the suspension arm and terminates before the end of the suspension. The prism or mirror directs the output from the fiber onto the transducer on the slider. To couple the light into the optical transducer, it is desirable to maintain alignment of the light on the slider as the slider flies over the disc.

This invention eliminates the optical fiber and provides for free space coupling of the light beam to the slider. Since the light delivery system is not mechanically coupled to the slider, an alignment process is required. The angle at which light shines on a grating, also called the grating input angle, should be controlled with a tolerance of about 0.1°. In addition, the beam position on the face of the slider should be controlled with a tolerance of about 10 µm. This invention provides several apparatus for proper alignment ensuring that the system operates with optimal coupling efficiency. These apparatus can be used in either experimental setups or in a product.

Figure 3:
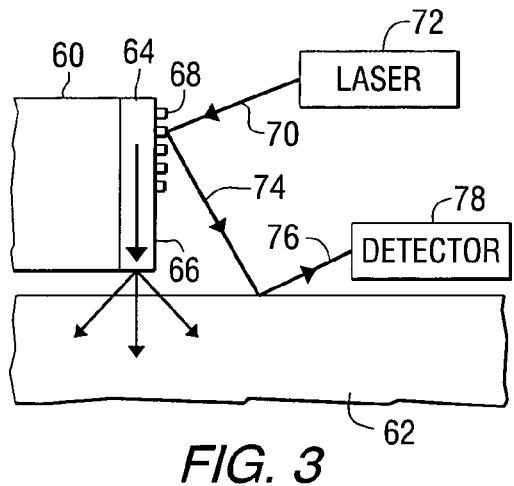
FIGS. 3, 4 and 5 are schematic representations of a portion of a slider in combination with a recording medium.

FIG. 3 is a schematic representation of a portion of a slider 60 in combination with a recording medium 62 in the form of a disc. A planar waveguide 64 is positioned adjacent to an end 66 of the slider. A coupling grating 68 is provided to couple light into the planar waveguide. Light incident on the coupling grating can either be scattered off of the grating, couple into the waveguide or reflect off of the waveguide. Light 70, which can be provided by a laser 72, is reflected 74 off of the waveguide, bounces off of the disc, and can be reflected back 76 into the optical system. The optical system can include a detector 78 for detecting the amount of reflected light. Since the back of the slider and the surface of the disc are nearly perpendicular, the slider-disc combination act as a retro reflector and the reflected beam 76 is substantially parallel to the incident beam 70. By monitoring the amplitude of the reflected light, it is possible to infer the correct alignment of the light beam onto the grating. For example, when the reflected light is a minimum, then the light coupled into the waveguide would be a maximum. The characteristics of the reflected signal are strongly dependant on the coupling efficiency of the grating and for good quality gratings, a large dip in the reflected signal is observed when the beam is properly aligned. In addition, some of the light that is coupled into the waveguide is reflected back toward the grating from the disc or the bottom surface of the waveguide. Some of this light is also coupled out of the waveguide and can be monitored by a detector.

A mechanism can be provided to move the laser beam, for example by moving the laser or by using optical devices to move the laser beam. By raster scanning the back of the slider it is possible to obtain a reflectivity map of the waveguide and the rest of the slider. Using this reflectivity map the center of the grating can be located and the spot can be centered on the grating for proper alignment.

Figure 4:
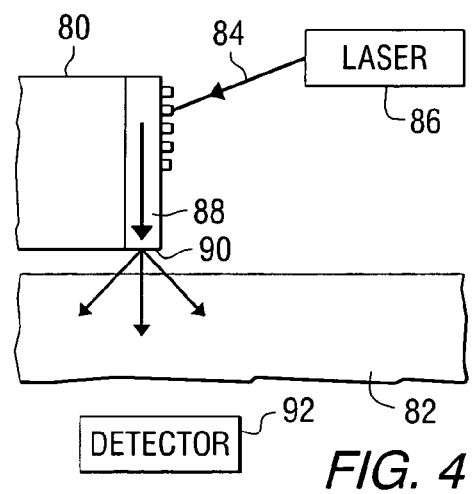

Rather than monitor the reflected signal as in the example of FIG. 3, the light coupled into the waveguide can be monitored. FIG. 4 is a schematic representation of a portion of another slider 80 in combination with a recording medium 82 in the form of a disc. Referring to FIG. 4, the light 84 from a laser 86 is coupled into the waveguide 88 and propagates out of the bottom 90 of the waveguide. A detector 92 can be positioned to detect this light. By measuring the signal from the detector, the coupling angle can be adjusted for maximum coupling efficiency. This can be done with or without media. For example, in a real drive using a load/unload technique, when the head is parked it can be positioned above a detector. If the media is transparent, the transmitted power can be measured under dynamic flying conditions.

Figure 5:
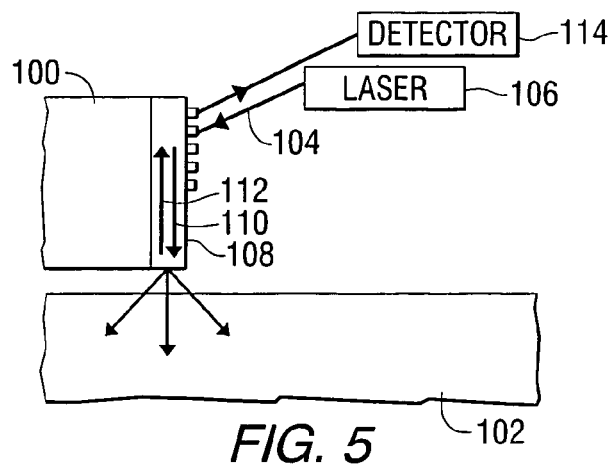

FIG. 5 is a schematic representation of a portion of another slider 100 in combination with a recording medium 102 in the form of a disc. Referring to FIG. 5, the light 104 from a laser 106 is coupled into the waveguide 108 and propagates out of the bottom of the waveguide. Light 110 that is coupled into the waveguide will reflect off of the bottom of the slider and propagate towards the top and pass under the grating, as illustrated by arrow 112. For example, if the grating is 40% efficient, 40% of this light will be coupled back out of the waveguide and a portion of the remaining light will propagate out of the top of the slider. A detector 114 can be positioned to detect this light. By placing an optical detector here, it is possible to monitor the light coupled into the waveguide. The detector can be mounted on a suspension arm. In the examples shown in FIGS. 4 and 5, the same grating that couples light into the waveguide is used to infer the correct alignment.

Figure 6:
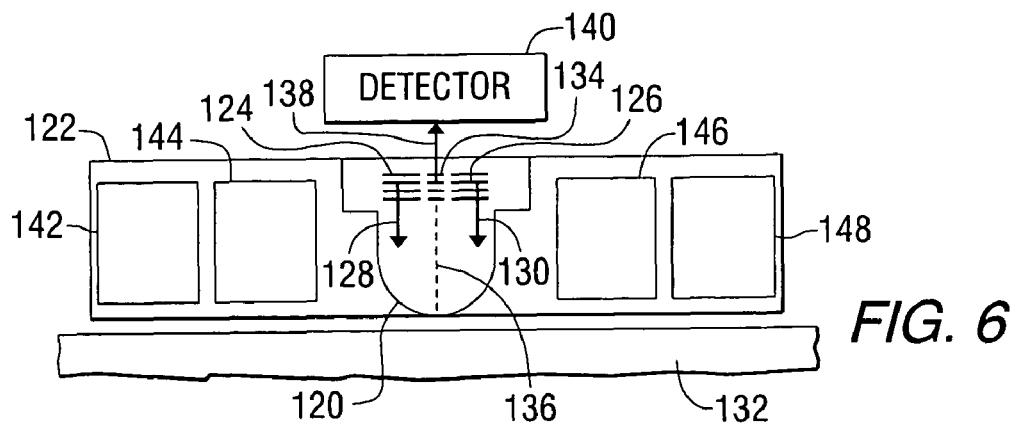
FIGS. 6, 7, 8, 9, 10, 11 and 12 are elevation views of optical transducers constructed in accordance with this invention.

FIG. 6 shows an end view of a slider where a special grating is made for aligning the system. In FIG. 6, a planar waveguide 120 is positioned adjacent to an end of the slider 122. Gratings 124 and 126 are provided on the waveguide to couple light 128 and 130 into the waveguide in a direction toward a storage medium 132. An additional grating 134 is positioned along a central axis 136 of the waveguide to couple light 138 into the waveguide, but in a direction away from the storage medium. A detector 140 can be positioned above the slider to detect the light 138. Contact pads 142, 144, 146 and 148 are provided on the end of the slider to provide electrical connections for other parts of the slider that are not a part of this invention.

When a light beam is directed onto the end of the slider, the portion 138 of the light that is coupled into the waveguide is detected by detector 140. If the beam has, for example a Gaussian intensity distribution, if the beam moves to the right or left, the amount of light detected by the detector will decrease. The position of the beam can be adjusted to maximize the amount of light detected, which corresponds to the beam being centered on the gratings.

FIG. 6 shows the addition of a third grating that resides in the dead region between the two offset gratings. This grating is designed to couple light in the opposite direction of the two gratings and can be designed to have the same coupling angle as the gratings. When the signal on the detector is maximized the correct coupling angle has been achieved. The third grating can be either used to couple the TE or TM mode of the waveguide. To prevent the light reflected from the other waveguides from polluting the detected signal, a polarizer can be placed in front of the detector. If the third grating is designed for TM light while the coupling gratings are designed for TE light, the polarizer will block the light that is reflected from the coupling gratings.

Figure 7:
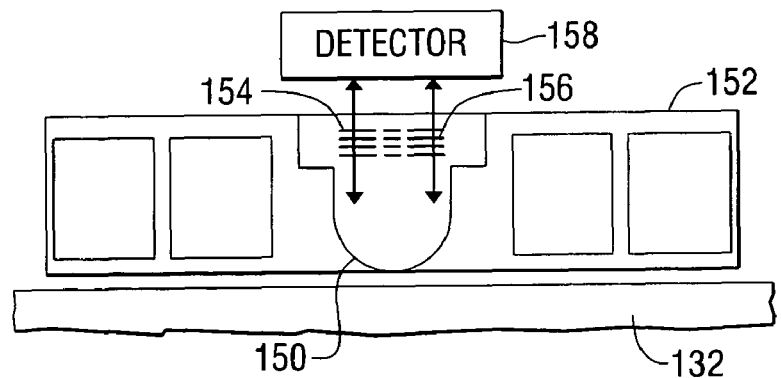

FIG. 7 shows an end view of a slider where a special grating is made for aligning the system. In FIG. 7, a planar waveguide 150 is positioned adjacent to an end of the slider 152. Gratings 154 and 156 are provided on the waveguide to couple light into the waveguide. In this example, the gratings are designed to couple light both toward and away from the storage medium 132. A detector 158 is provided to detect light that is directed away from the storage medium.

In FIG. 7 the third grating has been eliminated and gratings have been modified to couple light into the waveguide and propagate the coupled light in opposite directions. For example, the grating can be designed to propagate a percentage of the TE mode, say 10%, towards the top of the waveguide and the remaining 90% to the near field transducer. In addition, the gratings can also be designed to couple the TE mode towards the near field transducer and the TM modes towards the top of the slider. By rotating the input polarization of the light on the grating, the amount of light coupled into the TM mode can be adjusted. By using the polarizer discussed above the light reflected from gratings 154 and 156 can be blocked.

Figure 8:
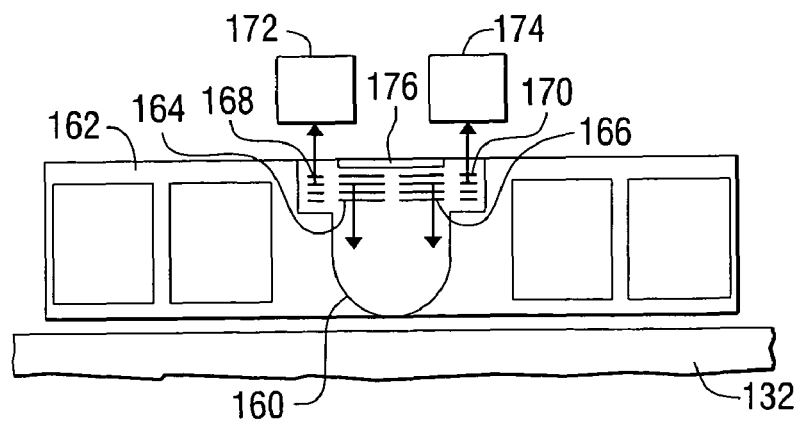

The examples shown in FIGS. 6 and 7 will only optimize the correct coupling angle. To center the spot, two gratings can be fabricated to the left and right of the coupling grating as shown in FIG. 8. FIG. 8 shows a planar waveguide 160 positioned adjacent to an end of the slider 162. Gratings 164 and 166 are provided on the waveguide to couple light into the waveguide in a direction toward a storage medium 132. Gratings 168 and 170 are positioned on the sides of gratings 164 and 166 and designed to couple light into the waveguide in a direction away from the storage medium 132.

In this example, two detectors 172 and 174 are needed and the system is properly aligned by adjusting the angle to maximize the total signal on both detectors and then moving the spot laterally to minimize the difference signal. In FIG. 8 a screen 176 is shown to block the light from the reflection from gratings 164 and 166 but the techniques described above can also be used to block this light. The gratings in FIG. 8 can also be designed to couple light in towards the air bearing and then reflected back from the mirrors shown in the FIG. 7. This way the gratings for the transducer and for the alignment are identical.

Figure 9:
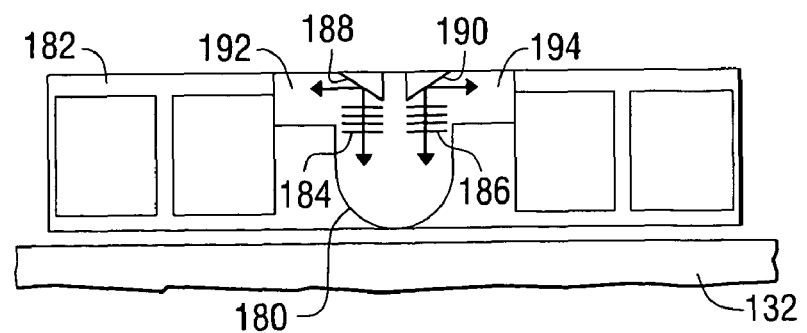

Scattering zones can be used to monitor the light. FIG. 9 shows a planar waveguide 180 positioned adjacent to an end of the slider 182. Gratings 184 and 186 are provided on the waveguide to couple light into the waveguide and in directions both toward and away from the medium 132. Interfaces 188 and 190 direct the light into scattering zones 192 and 194. With the example of FIG. 9, the coupling efficiency can be monitored during dynamic flying conditions. For phase change media, where the data is encoded by changes in the medium reflectivity, this option also would be a possibility for an optical read back channel.

The gratings not only couple light into the waveguide but also scatter light perpendicular to the surface. The scattered light can be seen using a conventional CCD camera. Using software, the intensity of the signal coupled into the waveguide can be measured and the coupling angle can be adjusted to maximize this signal. When the signal is maximized the optimal coupling angle has been found. It is also possible to add secondary alignment features to the head that increase the amount of light scattered out of the waveguide. An example is shown in FIG. 9 where the beam, after it is back reflected by the SIM, is deflected 90 degrees to two scattering zones. By monitoring the scattered light in these zones with the CCD camera both the optimal coupling angle and proper alignment can be achieved. Since a CCD camera is required this technique may be suitable for one-time alignment during the fabrication process. The camera images the light spots at the two scattering zones, and the light intensity in the two zones is compared as the beam is aligned. When the intensity is the same, then the beam is centered.

A scattering zone may be created by creating pinholes or other features on the waveguide layer with or without the use of additional reflective layers.

Figure 10:
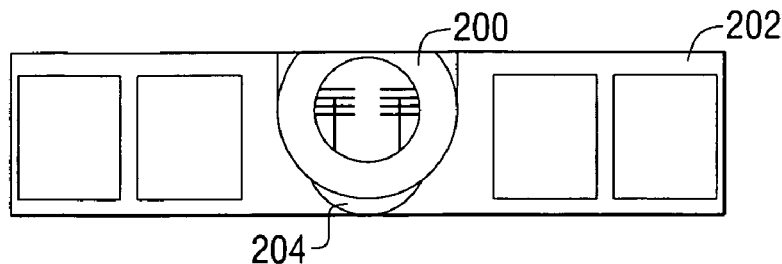

Although the retro reflectors in FIGS. 6, 7 and 8 can be used to align the angle and position of the spot on the grating, it is not practical to raster scan the spot on the slider during disk operation. FIG. 10 shows an example that permits active control of both the angle and the position of the beam on the slider. In FIG. 10, a two-dimensional donut 200 fabricated from a highly reflective metal is deposited on the top of the slider 202. Since the waveguide structure 204 is buried deep in the slider, the metal from the donut will not interfere with the grating. Assuming good quality gratings, to align the system the angle is adjusted to minimize the reflected signal. Once this is done, the position of the spot on the donut is moved around to also minimize the magnitude of the reflected signal. Since the donut is highly reflective, if the spot moves off of center, the reflectivity will increase. A simple servo scheme can be developed to maintain the correct position on the back of the slider. Alternative structures can be used in place of the donut structure of FIG. 10. For example, reflective structures having an opening that allows light to reach the grating can be used. This can be achieved by including an opening in the reflective structure. The opening can be in the center of the structure.

Figure 11:
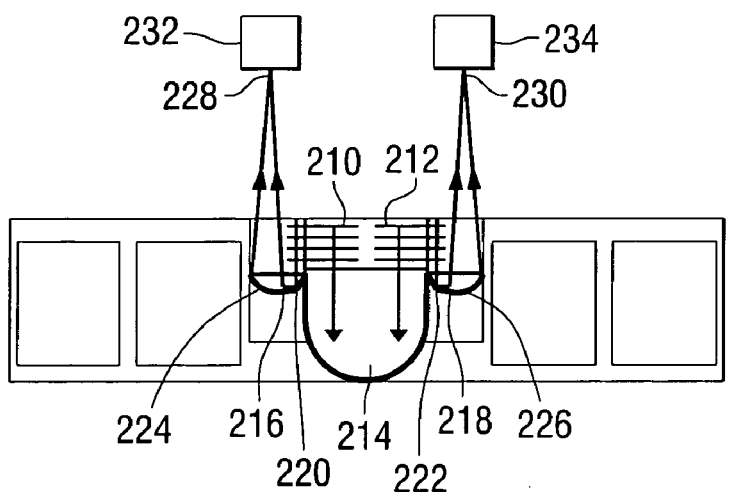

It is particularly advantageous to have an alignment system which directly measures the light which is coupled into the grating with the correct polarization and propagation direction for the transducer itself. This can be done using the example shown in FIG. 11. The gratings 210 and 212 extend outside of the SIM 214 for a short distance. The incident laser beam is centered on the gratings and a portion of light in the tails of the Gaussian intensity distribution of the laser spot extends into the grating region outside of the SIM. This light is launched in a collimated beam towards the bottom of the slider, like the light launched within the SIM. However, it strikes mirrors 216 and 218 on each side of the grating as shown. The mirrors may each be a composite mirror including a 45°straight mirror 220, 222 and an off-axis parabolic mirror 224, 226 (in either order) as shown, for example. This would cause the light to be reflected back out of the top of the waveguide on the slider and brought to two separate foci 228, 230 at the positions of detectors 232, 234 on the load beam, for example. Measurement of the detector sum signal would indicate maximum coupling efficiency, while the difference signal would indicate correct alignment in the horizontal direction.

Figure 12:
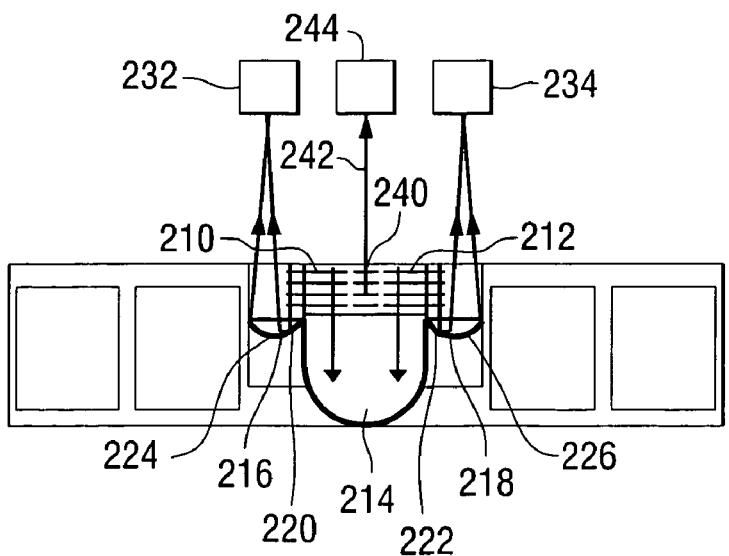

One disadvantage of this approach is that while the system can be aligned by maximizing the sum signal, when the alignment drifts there is no indication to the servo system of the direction of drift. One way to address this issue would be to include an additional grating 240, perhaps in the center of the grating as shown in FIG. 12. This grating would be given a period such that it launched the incident light 242 in the opposite direction toward another detector 244. However, the grating period would be deliberately chosen to be detuned from the angle which gave maximum launching efficiency for the grating. If the incident angle varied away from the ideal angle, indicated by a drop in the coupled signal, there would be a corresponding increase or decrease in the light intensity coupled into the central mode by the detuned grating. This increase or decrease would be sufficient to indicate the direction of angle shift of the incident light.

Alternatively, if it was found that it was not necessary to correct in the servo for horizontal drift of the beam relative to the slider, then the gratings on the left and right of the grating as shown in FIG. 8 could be both deliberately detuned slightly from the optimum grating period in the center of the grating, but in opposite directions. In this manner, if the incident angle drifted in one way or the other, the light reflected out of the slider on one side or the other would brighten, and the opposite side would dim. This would generate a difference signal that could be used to servo the incident angle.

With combinations of elements from the above examples, a number of additional options will be apparent. By placing a number of gratings and reflective elements on the face of the slider or in the waveguide, the angle of the beam and its position can be detected. This can be used for initial alignment or part of a control loop that dynamically adjusts the beam to maintain optical alignment. Additional options include the use of an additional alignment beam potentially of a different wavelength or polarization to sense the gratings or reflectors. When the polarization or wavelength is changed, the coupling angle for the grating also changes. Therefore, an additional beam can be incident onto the gratings at a different angle to sense coupling efficiency.

In another aspect, the invention encompasses an apparatus for directing light directly onto a slider. FIG. 13 shows the basic concept. A laser diode 250 or fiber is mounted directly to the actuator arm 252 or the E Block 254 with the necessary beam conditioning lenses. A slider 256 is supported by the actuator arm, which pivots about point 258 to move the slider in an arc across a storage disc 260. The laser beam 262 is gently focused to a spot, having diameter of for example 60 µm, but is first reflected off of a curved mirror 264 on the far side of the drive. In this embodiment for a 65 mm disc, the beam will travel a free space distance on the order of 150 mm which is 50 mm less then the propagation distance used in some spin stands. The advantage of this technique is that the slider and suspension remain unchanged and the only changes required for a HAMR drive are in the transducer design and the addition of a laser and mirror to the drive. In multiple head drives, one mirror could serve all of the heads or a unique mirror could be designated for each head or a set of heads. The mirror shown in this FIG. 13 is circular and would be relatively inexpensive and easy to make. For the purposes of this description the term "curved mirror" encompasses all non-flat mirrors.

With a circular mirror 270, as shown in FIG. 14, in order for the light reflected from the mirror to always be normal to the grating on the slider 272, the axis of rotation 274 for the actuator arm 276 (or the E-block) must be the bisector 278 of the reflection point 280. The slider will still move on an arc but its center of rotation will be different than it is in current drives. Dynamic performance of the mechanical system as shown may be poor due to the large asymmetry.

There are a number of different ways to minimize these effects. For example, the simplest method is to simply move the laser from the side of the actuator arm to the center in line with the slider as shown in FIGS. 15 and 16. FIG. 15 is a plan view of an actuator arm 290 having a laser module 292 mounted on an axis 294 between the pivot point 296 and a mirror 298. FIG. 16 is a side view of the suspension arm of FIG. 15. The apparatus of FIGS. 15 and 16 return the rotation point of the slider to its normal position. The benefit of this approach is that bending modes of the suspension and the actuator arm will not have significant contribution to off-track motion of the slider due to the symmetry of the system. This approach is ideal for recording systems with single-disc single-head configurations. Since the laser located on the top side of the actuator arm is easily accessible, optical alignment during drive assembly (if needed) can be very straightforward. Fine positioning of the slider 300 can be achieved by including a positioning arm 302 that can be rotated about pivot point 304.

For multi-disc multi-head systems, the physical dimensions of the laser may make stacking multiple disks in a drive difficult and the spacing between the discs will need to be increased. Therefore, an offset axis laser like FIG. 17 is preferred. In FIG. 17, the laser module 310 is offset with respect to the axis 312 of the actuator arm 314. In the example of FIG. 17, the suspension 316 can rotate relative to the actuator arm 314 to position the transducer grating at a skew angle with respect to the axis of the actuator arm. The long axis of the suspension is pivoted about pivot point 318 to move the center of the slider so that the grating of the slider is normal to the reflected light beam from the circular mirror 320.

This approach allows the actuator arm and bisector 322 to share a common rotation point, but no special alteration on the suspension is needed. With the slider along the axis of symmetry of the suspension and at or near the center axis of the actuator arm assembly, cross-track motion of the slider due the arm assembly resonance is minimized. The laser can be made accessible for drive-level alignment yet tight physical constraints for multi-disc multi-head drives can be met.

As shown in FIG. 17, the laser is aligned so that the output beam 324 is parallel to the long axis 312 of the actuator assembly. However, in practice, the laser alignment angle should be optimized so that the rotational angle of the suspension is minimized. Geometric constraints however come from the length of the actuator arm (or E-block), length of the suspension, the distance between the laser and the center axis of the actuator arm, and the location of the circular mirror.

Figure 18:
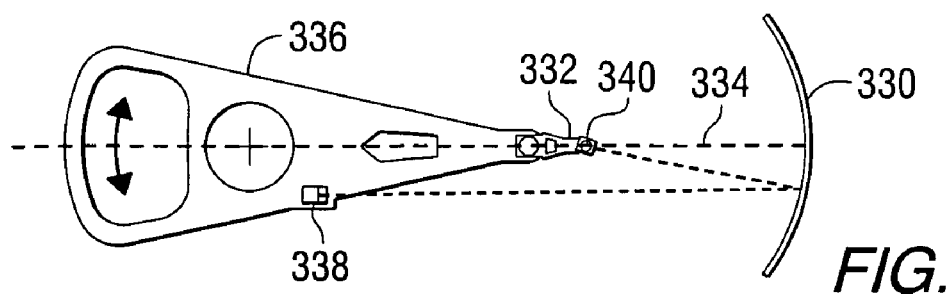

Another alternative configuration based on the circular mirror 330 is shown in FIG. 18. In this case the suspension 332 is mounted along the central axis, or plane of symmetry, 334 of the actuator arm 336 (or E block) while the laser 338 is mounted off axis. The slider 340 and the gimbal are turned so that the incident light beam from the curved mirror is normal to the slider optical grating. The plane of the grating can be positioned at a skew angle with respect to the central axis, or axis of symmetry, of the actuator arm by using a mounting block to support the slider. This mechanical configuration potential may result in improved mechanical performance. The use of a curved mirror may help to simplify skew and disc coverage issues found in 180 degree reversed slider configuration described below which does not use the curved mirror described here.

An actuator can be added to the laser module or mirror to dynamically adjust the light beam for vertical run-out and drift, or to statically adjust the light beam for keeping the suspension and slider point straight.

In other examples, a non-circular curved mirror can be used. The rotated slider configuration still suffers from increased disturbance due to mechanical asymmetry. As an alternative implementation to a cylindrical mirror, it is possible to construct a curved mirror such that the slider does not have to be rotated, yet the incident angle to the grating is near zero. In this case, an actuated steering mirror is required to compensate for the change in optical path length for different actuator arm positions. A significant benefit of this configuration is that tracking performance is no longer compromised.

Figure 19:
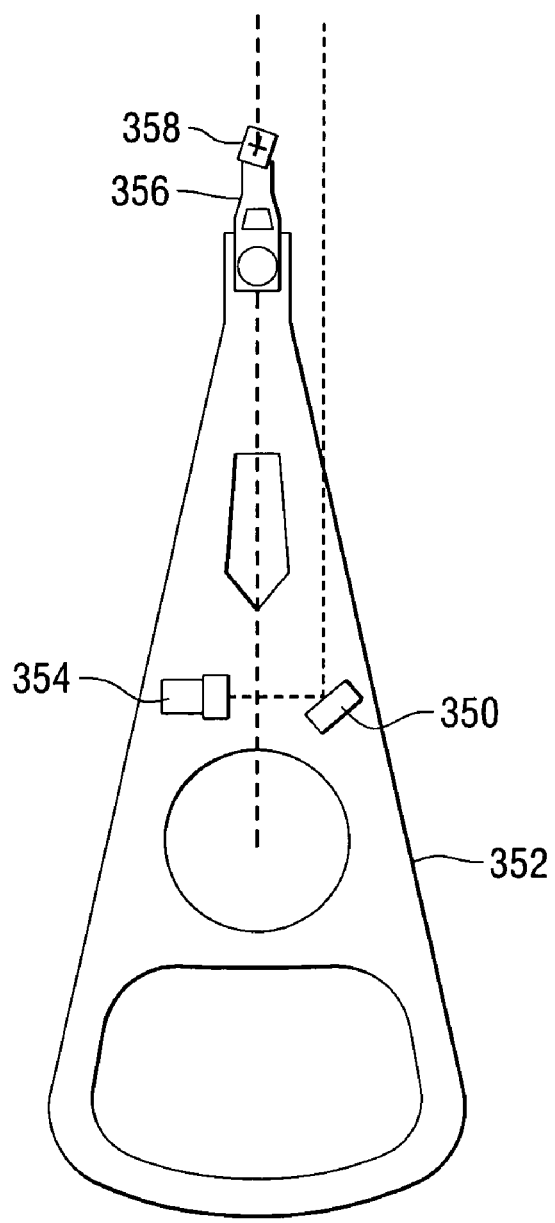

It is possible that the vertical runout of the spindle will be large so that the position of the optical spot will need to be actuated during normal drive operation. Vertical movement of the E-block during actuation is another potential source of misalignment. If dynamic optical alignment is required, either the curved mirror or the laser diode can be actuated to optimize the light position on the slider. An additional movable small mirror 350 on the actuator arm 352 for beam steering is also possible, as shown in FIG. 19. In FIG. 19, the laser 354 is mounted on the actuator arm 352. The suspension 356 is mounted at the end of the actuator arm and supports the slider 358. It is preferable to move the component which has the least mass (to minimize the required actuation voltage and power). It is desirable to permanently fix the more massive component(s) which will be more susceptible to external vibration and shock. Electro optic beam deflection devices may also be possible for beam steering if mechanical actuation is not feasible. The vertical runout on the current HAMR spin stand is on the order of 18 μm to 50 μm. If we assume a similar value for a drive, the laser needs to be actuated less than one tenth of a degree to follow this runout. This additional servo control loop required for mirror steering can be implemented using low-cost electronics on a small circuit board with a quadrature photo detector and analog feedback circuit. If large angles of beam steering are achievable within a targeted power and cost budget, a DC bias may be applied to the beam steering mechanism to compensate for static assembly tolerances thus relaxing assembly alignment requirements.

With an actuated mirror, it is possible that one laser beam could service two heads. The mirror would be steered to couple to light into the down facing or up facing head. This could reduce the number of optics by a factor of 2. It would require a large stroke about 10 degrees for the actuated mirror. This could be extended to more than two heads but the stroke would be larger and heads would have different preferred coupling angles.

If a linear actuator is used instead of a rotary actuator, a straight mirror rather than a curved mirror is desirable. The principles remain the same and many of the features discussed above can be implemented with a straight mirror.

Figure 20:
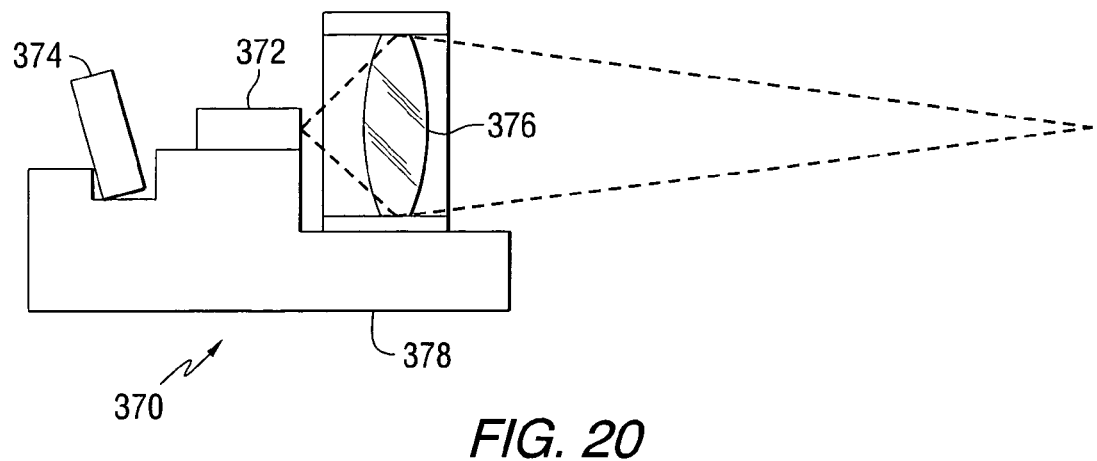
FIG. 20 is a laser module that can be used in the invention.

FIG. 20 shows a laser module 370 containing laser diode 372, a rear facet monitor 374, and a finite conjugate lens 376 mounted on an optical bench 378. The laser diode would be selected for wavelength, power, and reliability. It could be mounted on a carrier that was mounted to an optical bench. A photodiode would monitor the laser diode power by sensing the light from the rear facet of the diode. A lens would be aligned in the optical bench to focus the light onto the grating coupler on the slider. The lens would be designed with a high numerical aperture (NA) on the laser side to capture substantially all of the laser emission. On the exit side the lens would have an NA on the order of 0.01 to produce a focused spot of about 60 microns. Laser diodes typically emit light with about a 3 to 1 aspect ratio in divergence angles. The light is often polarized parallel to the slow axis. It is important that the light be polarized along the gratings on the slider for coupling into the waveguide. This leads to a longer spot along the grating if the focus of the lens is at the slider. This may not be ideal for optimum coupling.

Alternatively, the focus could be off of the slider face or the lens could be toric in shape and include some beam shaping. The laser module can be on the order of 4×4×4 mm in size. Using more advanced fabrication processes, including wafer bonding, micro-lens formation, metal plating and evaporation, it is conceivable that a module with smaller dimensions may be possible. The base of the optical bench may be fabricated using a heat conductive material such as copper or other metal to serve as a heat sink for the laser diode.

In another aspect, this invention provides a disc drive having a suspension arm for an optical transducer comprising a load beam, a slider coupled to the load beam by a gimbal assembly and including an optical transducer positioned adjacent to an end of the slider facing a pivot point of the suspension arm, and a laser for transmitting light through free space to the transducer.

Figure 21:
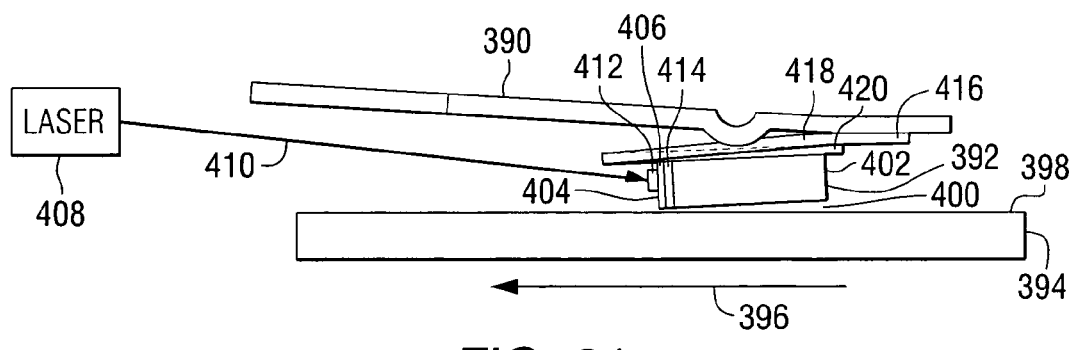
FIGS. 21, 22, 23, 24, 25, 26, 27, 28, 29, 30 and 31 are views of suspension arms and slider assemblies constructed in accordance with this invention.

FIG. 21 is a schematic representation of a portion of a suspension arm 390 and slider 392 constructed in accordance with this invention, in combination with a magnetic recording disc 394. During writing and/or reading of data, the disc moves relative to the slider in a direction indicated by arrow 396. The slider is positioned adjacent to a surface 398 of the disc and separated from the surface of the disc by an air bearing 400. The slider has a leading end 402, also called a front or distal end, and a trailing end 404, also called a back or proximal end. The leading end faces away from, and is therefore distal to, the pivot point of the suspension arm and the trailing end faces toward, and is therefore proximal to, the pivot point of the suspension arm. The slider includes an optical transducer 406 mounted adjacent to the trailing end. A source of electromagnetic radiation, such as a laser 408, produces a beam of light illustrated by arrow 410 that is delivered to the optical transducer 406 through free space. The optical transducer can include a grating coupler 412 for coupling the light into the transducer. The optical transducer can further include a planar waveguide for transmitting light to the air bearing surface of the slider. The light is then coupled to the surface of the disc to raise the temperature of a portion of the surface of the disc. The slider further includes a magnetic recording head 414 for producing a magnetic field that is used to affect the magnetization of the storage medium. A read head can also be included.

The slider is connected to the suspension 390 by a gimbal assembly 416. The gimbal assembly includes a first portion 418 connected to the suspension 390 and a second portion 420 connected to the slider 392. The second portion is cantilevered to the first portion.

Figure 22:
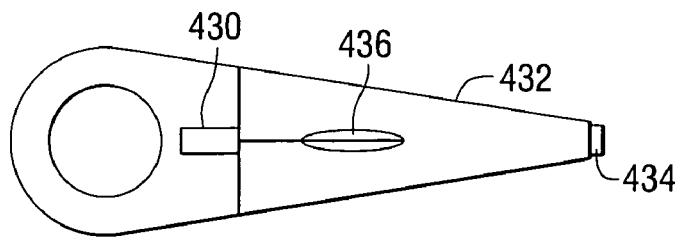
Figure 23:
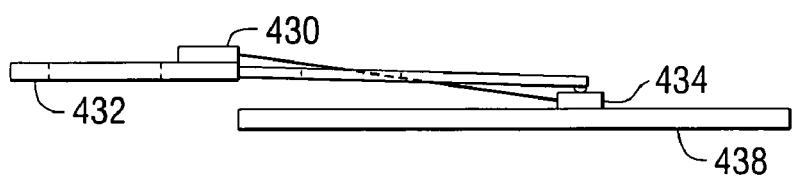

The small laser module would then be mounted on the moving e-block. Preferably the laser module, LM, would be near the pivot point of the rotary actuator to minimize the additional inertia. A number of different mounting options are shown in FIGS. 22-31. FIG. 22 is a top plan view and FIG. 23 is a side view of a laser module 430 mounted on the top of an arm 432. A slider 434 is positioned near the end of the arm. The laser module directs a laser beam through an opening 436 in the arm to the slider, which is positioned near a surface of a storage medium 438.

Figure 24:
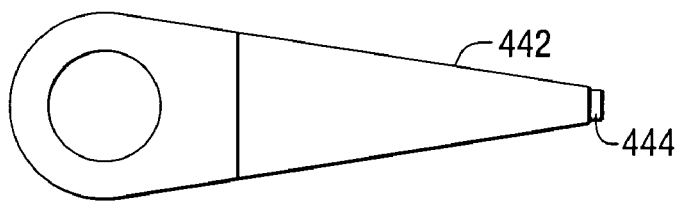
Figure 25:
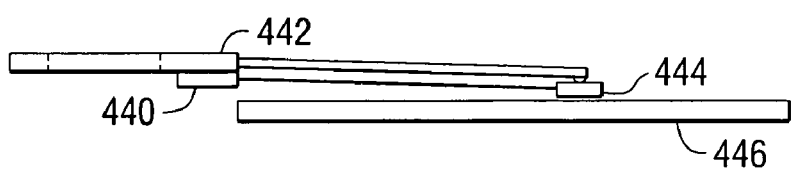

FIG. 24 is a top plan view and FIG. 25 is a side view of a laser module 440 mounted on the bottom of an arm 442. A slider 444 is positioned near the end of the arm. The laser module directs a laser beam to the slider, which is positioned near a surface of a storage medium 446.

Figure 26:
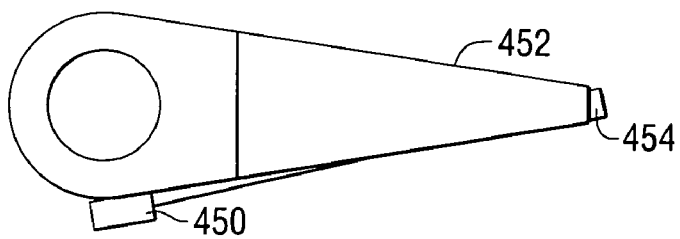
Figure 27:
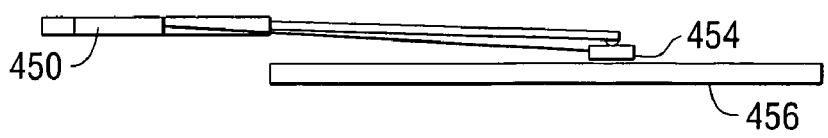

FIG. 26 is a top plan view and FIG. 27 is a side view of a laser module 450 mounted on the side of an arm 452. A slider 454 is positioned near the end of the arm. The laser module directs a laser beam to the slider, which is positioned near a surface of a storage medium 456.

Figure 28:
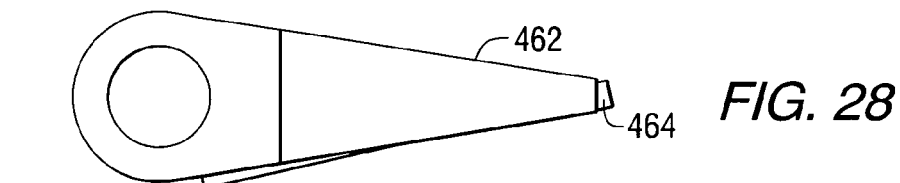
Figure 29:
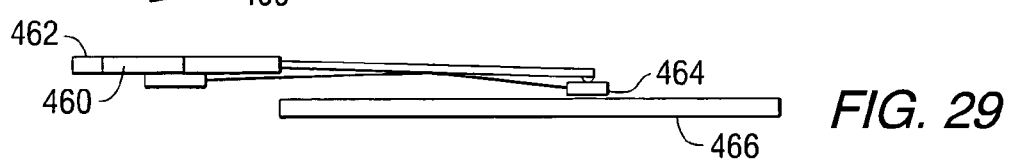

FIG. 28 is a top plan view and FIG. 29 is a side view of a laser module 460 mounted on the bottom of an arm 462. A slider 464 is positioned near the end of the arm. The laser module directs a laser beam into a bottom surface of the arm where it is reflected to the slider, which is positioned near a surface of a storage medium 456.

Figure 30:
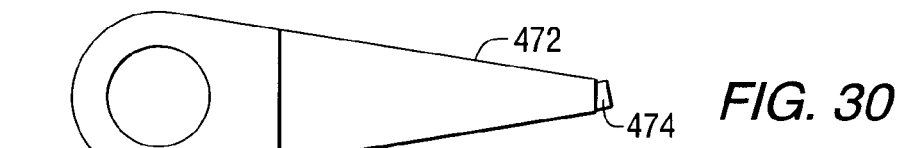
Figure 31:
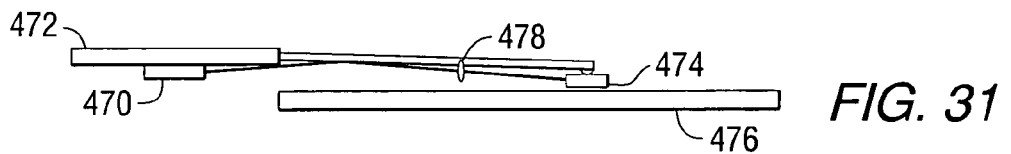

FIG. 30 is a top plan view and FIG. 31 is a side view of a laser module 470 mounted on the bottom of an arm 472. A slider 474 is positioned near the end of the arm. The laser module directs a laser beam into a reflective surface positioned at the bottom surface of the arm where it is reflected to the slider, which is positioned near a surface of a storage medium 476. Focusing optic can be used to focus the light onto the grating. In this example, a lens 478 is included to focus the beam onto the slider.

The laser module, LM, is mounted on top as in FIGS. 22-23, below as in FIGS. 24-25, or on the side of the suspension as in FIGS. 26-31. The HAMR slider would be mounted to the head gimbal in the reversed direction or rotated from the reversed direction so that the plane formed by the incoming beam and reflected beam is orthogonal to the face of the slider.

Each variation offers some unique benefits. For example, when LM is mounted on top as shown in FIGS. 22-23, the module is easily accessible for alignment adjustment during drive assembly and its height is not severely limited by space constraint. When LM is mounted at the bottom as shown in FIGS. 24-25, the module is hidden during drive assembly, but this configuration enables more freedom of actuator arm design since no hole is required to create an optical path between the LM and the slider. For both the top and bottom configurations, the actuator arm structure is highly symmetric, thus can offer excellent mechanical response. LM being mounted on the side as shown in FIGS. 26-31 is most appropriate for multi-head multi-disk recording systems where the gap spacing between the disks are small. Side mounted LM may also be accessible during drive assembly for macro alignment adjustment. The configurations shown in FIGS. 28-31 offer flexibility of grating angle selection and beam focusing methods.

While options shown in FIGS. 23-31 are suitable for multi-head multi-disk recording systems, one tradeoff is that the slider being rotated between 0-180 degrees is not symmetric about the center axis of the actuator arm. As a result, motion corresponding to the bending mode of the actuator arm or the suspension will lead undesirable off-track motion of the slider. To address this problem, LM can be mounted on the side but a mirror located along the center axis of the actuator arm may be used to direct light to the slider. In this case, the slider is reversed 180 degrees and a symmetric positioning of the slider is achieved. The mirror as shown can be actuated to deal with static or dynamic misalignment described earlier. Alternatively, the mirror can be stationary and LM can be actuated to achieve the same purpose. A single long mirror may be used to service multiple heads and multiple laser modules, thus reducing assembly component count.

The grating design and light delivery are designed for a specific coupling angle generally less than 30 degrees. During drive assembly the laser module would be aligned to the HAMR slider. The tolerances are on the order of 0.1 degrees for the angular alignments and 10 microns for the position of the beam on the slider face. The module would be aligned using a precision fixture and then attached via screws, adhesive, soldering, a clamp, or welded. During operation there will be dynamic changes to the slider position due to disk runout or other causes. Ideally all of the motions could be contained within the optical coupling tolerances. Alternatively, the laser module could be mounted on an actuator that optimized the grating coupling by compensating for any slider motion. Since micro-waviness effects in the disk are too small to affect the coupling efficiency, only the effects of vertical runout, which are have frequency content corresponding to the spindle speed, need to be corrected and a relatively low bandwidth actuator is sufficient. FIG. 12 shows additional reflectors and out coupling gratings to allow sensing of the slider position and coupling efficiency.

Figure 32:
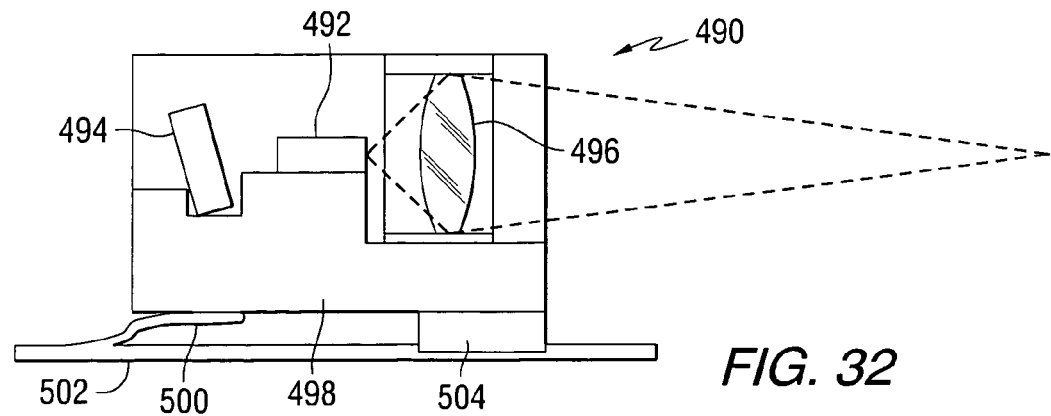
FIG. 32 is a laser module that can be used in the invention.

FIG. 32 shows a laser module 490 with piezoelectric pointing. This laser module includes a laser diode 492, a photo detector 494, and a lens 496 mounted on an optical bench 498. The optical bench is mounted to an arm 500 by a support member 502. The actuator 504 could be as simple as a piezoelectric motor under the front of the optical bench as shown in FIG. 32. For example if the slider moved 25 microns in the vertical direction with a 25 mm suspension arm length, the actuator could adjust the beam by 0.05 degrees to center the spot on the grating and reoptimize coupling. Additional optics could be placed in the path between the laser module and the slider, such as a mirror (d) or a mirror and a lens (e). These can change the relative effects of vertical motion of the slider on the coupling efficiency.

In particular, the lens should be positioned so that the grating on the slider is at the conjugate focus of the mirror which itself is positioned at the tilt point of the suspension. The laser is also brought to a focus at the mirror. If the lens is located close to the mirror, then a small tilt of the mirror due to vertical runout of the suspension will correspond to a small displacement of the position of the reflected beam on the lens and a corresponding small shift of the beam on the grating but with an angle of incidence that is nearly unchanged. In addition, since the deflection angles necessary for tracking the vertical run out are small, electro optic beam steering devices can also be used.

Another alternative is to mount the laser module onto the suspension as shown in FIGS. 22 and 23. Although this complicates alignment and increases inertia, it does compensate for the vertical runout. If the head moved upward by 20 microns, the beam would remain centered on the grating but the angle would change by 0.05 degrees for a 25 mm suspension arm length.

Figure 33:
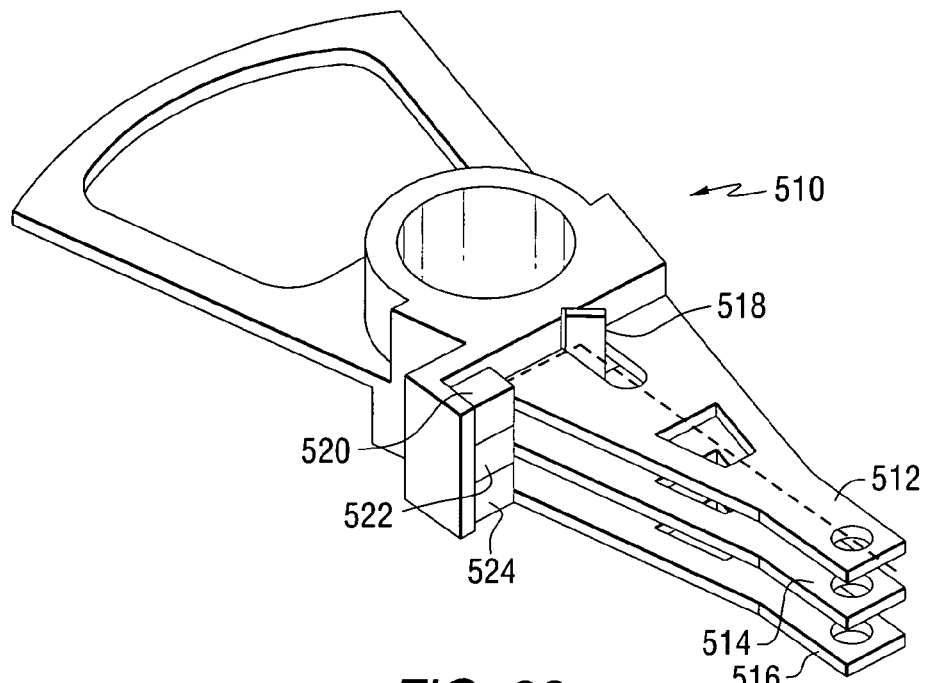
FIG. 33 is a schematic representation of an alternative slider assembly constructed in accordance with the invention.

FIG. 33 is a schematic representation of an alternative slider assembly 510 constructed in accordance with the invention. The assembly includes multiple actuator arms 512, 514 and 516, each capable of supporting a slider. A folding mirror 518 is positioned along a center axis 518 of the actuator arms. A plurality of laser modules 520, 522 and 524 are coupled to the actuator arms, but positioned off of the central axis. Light from the laser modules is directed onto the mirror and reflected toward optical transducers on the sliders. This assembly preserves the slider/suspension symmetry and uses 180-degree reverse sliders. A single mirror can service multiple heads. Alternatively multiple actuated mirrors can be used for head-to-head assembly variations, for dynamic alignment adjustment, and for laser module sharing.

Figure 34:
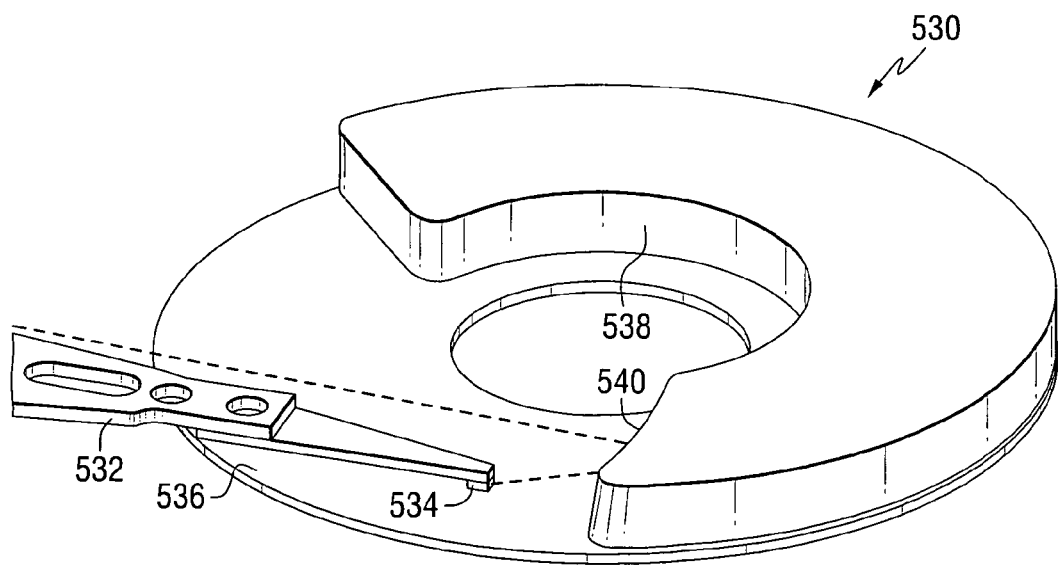
FIG. 34 is a schematic representation of a disc drive constructed in accordance with the invention.

FIG. 34 is a schematic representation of a disc drive 530 constructed in accordance with the invention. An actuator arm 532 is used to position a slider 534, having an optical transducer, adjacent to a recording medium 536. A stiffening assembly or damper plate 538 is positioned adjacent to the storage medium and includes a curved mirror 540. Light from a light source, not shown, is reflected off of the mirror and toward the optical transducer. This embodiment addresses potential space constraints that may preclude the mounting of the mirror beyond the disc, and shows that the mirror need not be positioned beyond the recording medium. Alternatively, the mirror can be mounted on a drive cover.

For all embodiments where the laser is mounted on the actuator arm, the laser module could be replaced by an optical fiber with the appropriate focusing optics, where the laser source is mounted elsewhere in the drive. A fiber can be mounted to move with the actuator arm without distorting the light or significantly influencing the motion of the actuator arm.

While the invention has been described in terms of several examples, it will be apparent to those skilled in the art that various changes can be made to the disclosed examples, without departing from the scope of the invention as set forth in the following claims.

What is claimed is:

1. An apparatus comprising:
    an optical transducer positioned adjacent to a storage medium and including a waveguide and a first grating that couples a first portion of light from a light source into the waveguide, wherein the optical transducer directs the first portion of the light to heat a first portion of the storage medium; and
    a detector configured to detect a second portion of the light that is not coupled into the waveguide, wherein the second portion is reflected off of the grating and then reflected off of a second portion of the storage medium prior to detection by the detector, and wherein the second portion of the light has a magnitude that varies in response to the amount of light coupled into the waveguide.

2. The apparatus of claim 1, wherein the light from the light source and second portion of the light include substantially parallel beams.

3. The apparatus of claim 1, wherein the optical transducer is mounted adjacent to a trailing end of a slider.

4. The apparatus of claim 3, wherein the light source is not mechanically coupled to the slider.

5. The apparatus of claim 1, wherein the light source comprises a laser.

6. The apparatus of claim 1, wherein light is coupled from the light source to the optical transducer over free space.

7. The apparatus of claim 1, wherein the storage medium comprises a magnetic disc.

8. The apparatus of claim 1, wherein the first portion of light is directed onto the storage medium from an end of the waveguide.

9. The apparatus of claim 1, further comprising a mechanism to align the light source with the optical transducer based on the detected magnitude of the second portion of light.

10. A method comprising:
    directing light from a light source to a grating that is optically coupled to a waveguide of an optical transducer, wherein the optical transducer directs a first portion of the light to heat a first portion of a storage medium positioned adjacent to the optical transducer; and
    detecting a second portion of the light that is not coupled into the waveguide, wherein the second portion is reflected off of the grating and then reflected off of a second portion of the storage medium prior to detection by the detector, and wherein the second portion of the light has a magnitude that varies in response to the amount of light coupled into the waveguide.

11. The method of claim 10, wherein the light from the light source and second portion of the light include substantially parallel beams.

12. The method of claim 10, wherein the optical transducer is mounted adjacent to a trailing end of a slider.

13. The method of claim 10, wherein the light source is not mechanically coupled to the slider.

14. The method of claim 10, wherein the light source comprises a laser.

15. The method of claim 10, wherein light is coupled from the light source to the optical transducer over free space.

16. The method of claim 10, wherein the storage medium comprises a magnetic disc.

17. The method of claim 10, wherein the first portion of light is directed onto the storage medium from an end of the waveguide.

18. The method of claim 10, further comprising aligning the light source with the optical transducer based on the detected magnitude of the second portion of light.

* * * * *